United States Patent [19]

Hagihara

[11] 4,220,540
[45] Sep. 2, 1980

[54] FILTERING SCRAPER

[76] Inventor: Tadashi Hagihara, 4-1, 5-chome, Minami Nagasaki, Toshima-ku, Tokyo, Japan

[21] Appl. No.: 14,867

[22] Filed: Feb. 26, 1979

[30] Foreign Application Priority Data

Sep. 18, 1978 [JP] Japan ................ 53-114361

[51] Int. Cl.² ........................... B01D 23/24
[52] U.S. Cl. ........................ 210/415; 210/498
[58] Field of Search ............ 210/407, 408, 413–415, 210/396, 397, 498; 209/379, 384, 397

[56] References Cited

U.S. PATENT DOCUMENTS

| | | | |
|---|---|---|---|
| 1,414,120 | 4/1922 | Fulcher | 210/413 X |
| 2,086,067 | 7/1937 | Cleveland | 209/397 X |
| 2,440,384 | 4/1948 | Schenke | 210/415 X |
| 3,312,530 | 4/1967 | Sackett | 209/384 X |
| 4,146,481 | 3/1979 | Nagatoshi et al. | 210/413 X |

*Primary Examiner*—William A. Cuchlinski, Jr.
*Attorney, Agent, or Firm*—Eugene F. Malin; Barry L. Haley

[57] ABSTRACT

A filtering system that includes a cleaning assembly and a filter element in the form of a plate with a plurality of long, narrow through openings or slits in each of a plurality of rows. The cleaning assembly includes a slit-cleaning system connected downstream of the filter element to clean each slit. The cleaning assembly may also include a scraper cleaning system positioned upstream of the filter element. As fluid enters the filtering system, the debris or trash is filtered from the fluid and deposited on the upstream surface of the filter element and in the slits for removal by the cleaning assembly.

12 Claims, 10 Drawing Figures

4,220,540

1

FILTERING SCRAPER

BACKGROUND OF THE INVENTION

Various types of wire filter means have been used in the past. The filter collected material restricts the filter openings and retards or stops the flow of fluid through the filter. No continuous positive acting means provides cleaning and debris removal from filter elements. Various types of wire filter means have been especially difficult to clean while in operation. The present invention provides a new and improved filtering and cleaning system for use in an operational filter apparatus.

BRIEF DESCRIPTION OF THE INVENTION

A new and improved filtering system that includes a filter element with a plurality of long, narrow through openings or slits and a cleaning assembly. The cleaning assembly includes a slit-cleaning system and a scraper cleaning system. As fluid enters the filtering system inlet, it passes through the filtering system. The debris or trash is filtered from the fluid and removed through the exit ports. The debris and trash deposited on the upstream surface of the filter element is removed by the scraper cleaning system. The debris that is deposited in the openings or slits is removed by the slit-cleaning system.

The slit-cleaning system includes a plurality of slit-cleaning elements connected to a slit holding means that is repeatedly or periodically driven across the downstream rear surface of the filter element. The slit cleaning elements are moved through each slit for removing debris deposited in the slit or openings. The debis is pushed upstream of the filter element.

The scraper-cleaning system includes a flexible blade that is moved across the upstream face of the filter element. The filter element is preferrably a plate with a plurality of slots in a plurality of rows. The blade scrapes debris off the front face or surface of the filtering element for removal. The scraper-cleaning system is repeatedly or periodically driven across the face of the filter element during the filtering process.

The filter includes a body of a generally broad upstream surface and a broad downstream surface. A plurality of rows of individual spaced apart through openings are incorporated in the body. The upstream surface has a plurality of thin entrances in rows. The downstream surfaces have a plurality of somewhat larger exits in rows. The entrance and exit of each slit is aligned. The openings have diverging longitudinal side walls and end walls between the entrance and exit. In one embodiment, each slit includes interconnecting slot portions between adjacent aligned slits in a column of slits each in an adjacent row on the downstream surface. The interconnecting slot portions act as tracks for aligning the slit-cleaning elements. The slits in each column are aligned along a single longitudinal center line.

It is an object of this invention to provide a plate filter with a particular slit configuration and shape.

It is another object of this invention to provide a plate or sheet filter with a plurality of slits and a downstream slit-cleaning system.

It is another object of this invention to provide a slit-cleaning system utilizing metal slit elements that move through the slit from the downstream side.

2

A further object is to provide a plate or sheet filter with slits having a width between 0.08 mm and 1.5 mm.

In accordance with these and other objects which will be apparent hereinafter, the instant invention will now be described with particular reference to the accompanying drawings.

DESCRIPTION OF THE PREFERRED EMBODIMENTS

Figure 1:
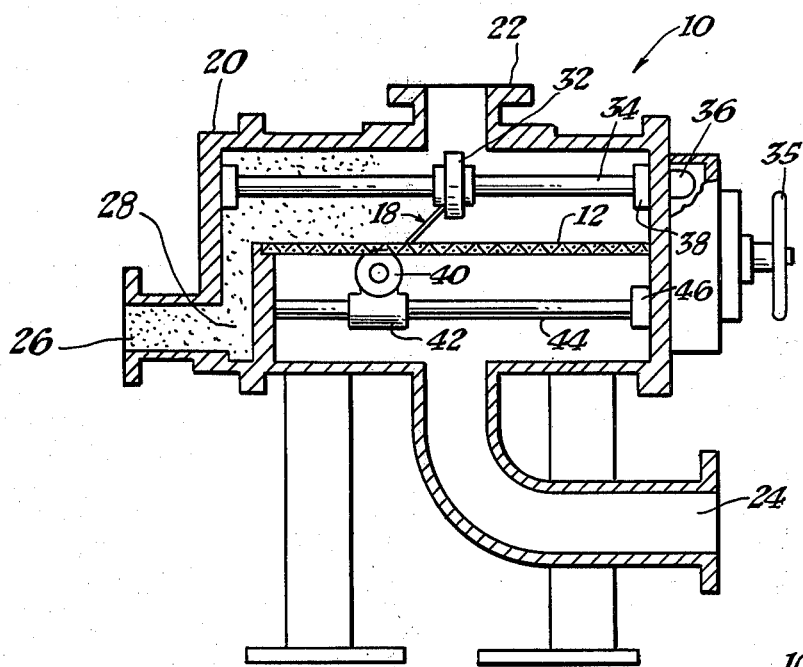
FIG. 1 is a side view in cross-section of the filtering system.

Referring now to the drawings and especially FIG. 1, illustrating a filter system 10 that includes a filter element 12 and a cleaning assembly. The filter elements have a plurality of long, thin through openings in a plate. The cleaning assembly includes a slit-cleaning system 16 and a scraper cleaning system 18. As shown in FIG. 1, the body 20 has a fluid inlet 22 and a fluid outlet 24 for fluids that are passed through the filtering system. A debris or trash removal port 26 provides an exit for various types of debris or trash that is removed from the fluid as it passes through the filtering system. The debris and trash is deposited upon the upstream surface and in the slits of the filter element 12. The debris is removed from the openings or slits by a slit-cleaning system 16. The deposited debris or trash is removed from the upstream surface of the filter element 12 by the scraper-cleaning system 18.

The slit-cleaning system includes a plurality of slit-cleaning elements 40 connected to slit holding means 42 that is driven back and forth across the downstream rear surface of the filter element 12 by screw shaft 44. Screw shaft 44 is driven by gear train 46 that in turn may be driven manually or by a motor such as motor 36. The slit-cleaning elements 40 are moved in the slits in the flat filter element or plate 12. The slit-cleaning elements 40 are moved through each slit for removing debris deposited in the slit openings. The debris pushed upstream of the filter element 12 by the slit-cleaning elements.

The scraper-cleaning system includes a flexible blade 30 that may be a Teflon blade. The blade 30 is moved across the upstream face of filter element 12 from right to left in FIG. 1. The blade 30 scrapes debris off the front or upstream face or surface of the filtering element 12. The blade 30 deposits the debris and trash in area 28 for removal out exit 26. A cover or cap not shown in placed over exit 26. The scraper-cleaning system includes blade 30 and is connected to scraper holding member 32. The scraper holding member 32 is driven back and forth across the face of the filter element 12 by screw shaft 34. The shaft 34 is driven or manually driven by wheel 35 or by any well known power source such as an electric motor 36 through intermediate gear box 38. Other scraper-cleaning systems may be used with this and other filtering systems.

Figure 2:
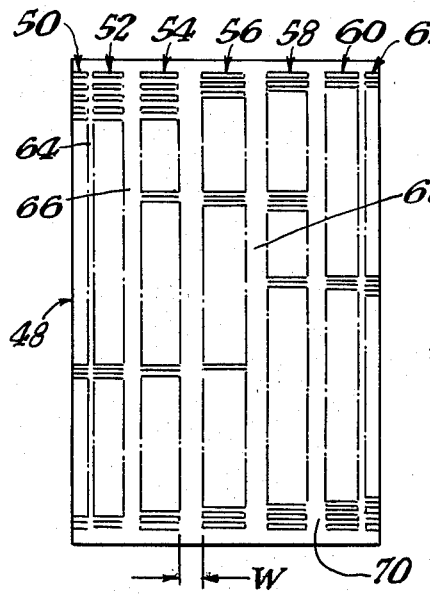
FIG. 2 is a side view of one embodiment of the plate filter element.
Figure 3:
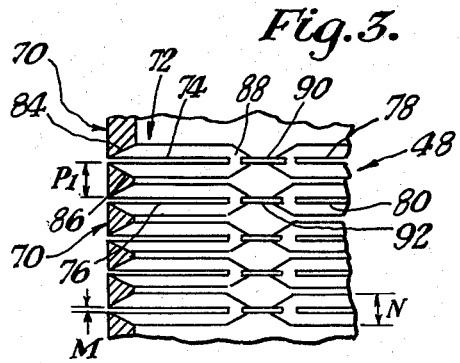
FIG. 3 is an enlarged partial view in cross-section of FIG. 2.
Figure 7:
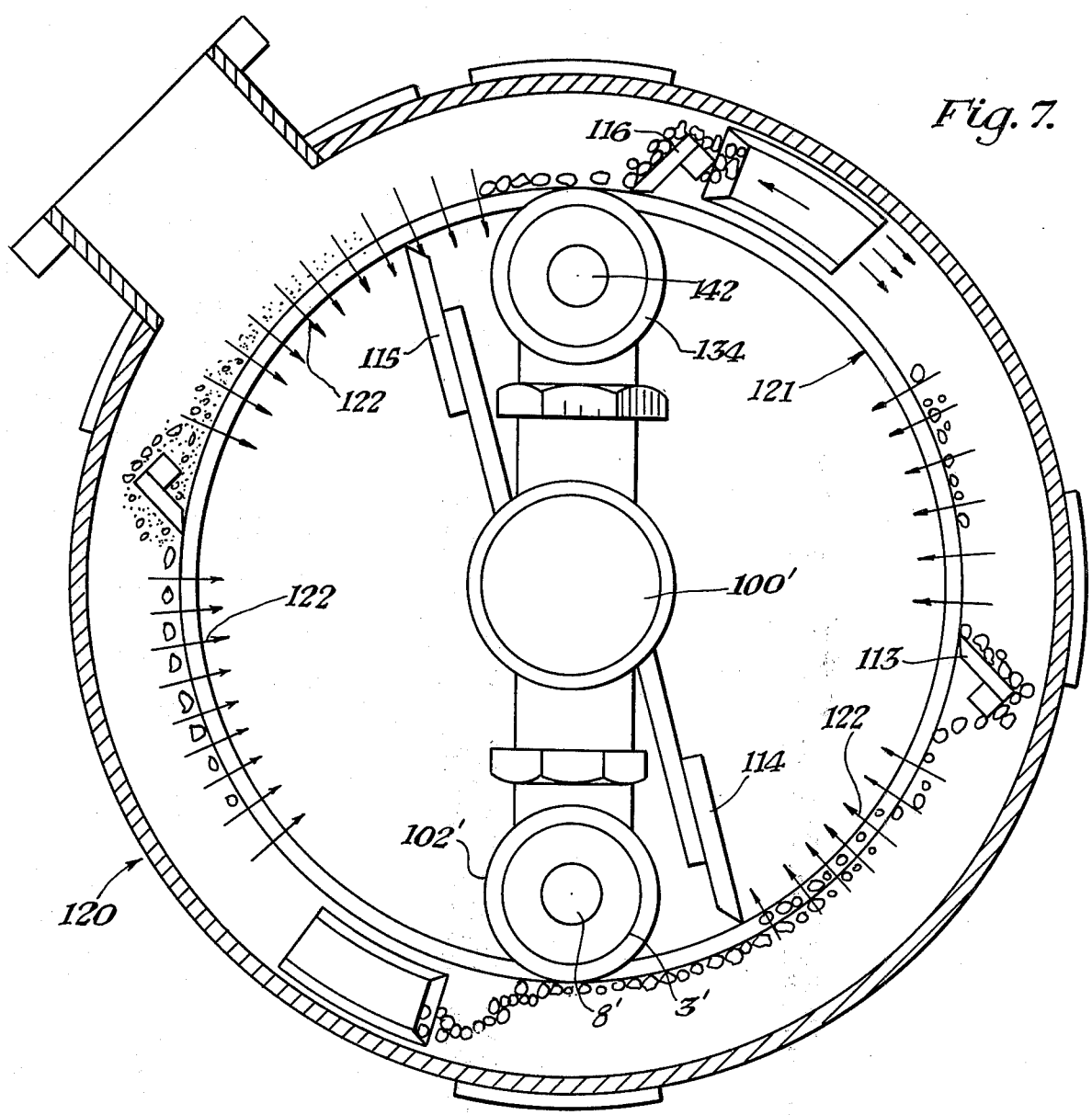
FIG. 7 is a top view illustrating another embodiment of the filtering system.

The filter element 12 as shown in FIG. 1 is flat, but the filter element may be of a circular design, such as illustrated in FIGS. 2, 3, and 7. The filtering element may also be in a variety of curved shapes to meet the particular application.

FIG. 2 is an illustration of the upstream surface 70 of a circular cylindrical filtering element 48. Filter elements 48 and 12 include slits of similar configuration. The filter element 48 includes a plurality of rows of slits or long narrow openings illustrated by numerals 50, 52, 54, 56, 58, 60, and 62 with additional rows on the rear side of the circular-cylindrical filtering element 48 not visible in FIG. 2. The rows may be equally spaced from one another as illustrated by numerals 64, 66, and 68. The spacing between each row is illustrated by the letter "W" in FIG. 2. The preferred "W" dimension is one as small as practical to increase the filtering capacity and reduce the head loss created by the filter element.

Referring to FIG. 3, showing a cut out portion of the circular-cylindrical filtering element 48, illustrating the inside or downstream surface of the filter element. The upstream surface has a smooth surface as shown in FIG. 2 except for the plurality of rows of slits or openings having a width illustrated by the letter "M" in FIG. 3. The openings have a long narrow entrance. The smooth upstream surface 70 allows a scraper element to move easily and effectively over the surface. Each of the entrances or inlets may be of the same width. The downstream or inner surface shown in FIG. 3 of the filtering element 48 referred to by numeral 72 includes a wider exit openings, illustrated by the letter N. The spacing or pitch between slits is illustrated by the letter $P_1$. The inner surface 72 is smooth and unobstructed except for cam surface means used in one embodiment of the invention that is disclosed hereinafter.

The filter element 12 and 48 are preferrably a stainless steel sheet or plate that may be constructed of sheet material between 2.5 millimeters and 5 millimeters in thickness. The sheets may be thinner or thicker than these presently preferred thicknesses. Each slit, such as slit 74, 76, 78, and 80, shown in FIG. 3, are generally long, narrow rectangular-shaped entrance openings. Varying length slits may be utilized for particular applications. The width of the slit is referred to by the letter "M" and the width of the slits are preferably between 0.8 millimeters and 1.5 millimeters. The width of the slit may be larger or smaller than the presently preferred sizes just mentioned.

Figure 8:
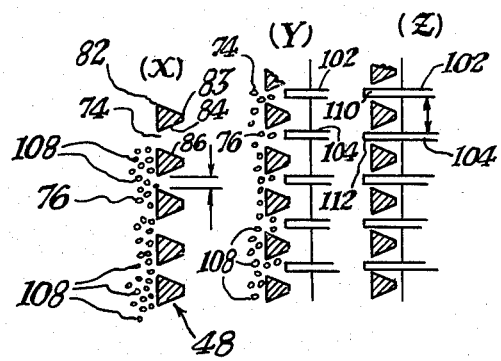
FIG. 8 is an illustration of the movement of the slit-cleaning elements into the slits.

Referring to FIG. 8, between the slit entrance shown at line 82 and the downstream exit shown at line 83, the preferred shape of the cavity is two diverging generally flat planar walls 84 and 86. The downstream opening is relatively large to reduce the head loss created by the filter element. The flat surfaces allow the slit cleaning elements 102 and 104 to be easily positioned and effectively used from the downstream side of the filter element.

Referring to FIG. 3, at each end of the slit opening 74, 76, etc. there are surfaces such as 88 that diverge away from the entrance on the downstream side 72 of the filter element 48, the rows of slits may be interconnected by intermediate connecting slots shown by numerals 90 and 92, etc. The slots 90, 92, etc. are at least as wide as the opening of the entrance 74, 76, etc. The slots 90, 92, etc. guide the slit-cleaning elements as they move from row to row.

Figure 6:
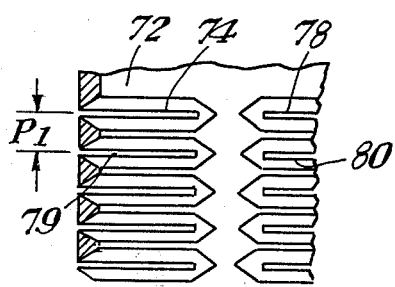
FIG. 6 is another embodiment of the filter as shown in FIG. 3.

FIG. 6 shows the openings without interconnecting slots. Such a filter is cleaned by a slit-cleaning system illustrated in FIG. 9.

Figure 5:
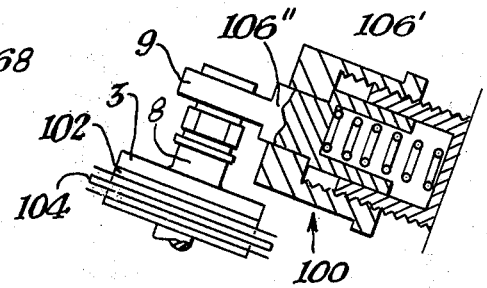
FIG. 5 is an enlarged partial view, partially in cross-section of FIG. 4.
Figure 4:
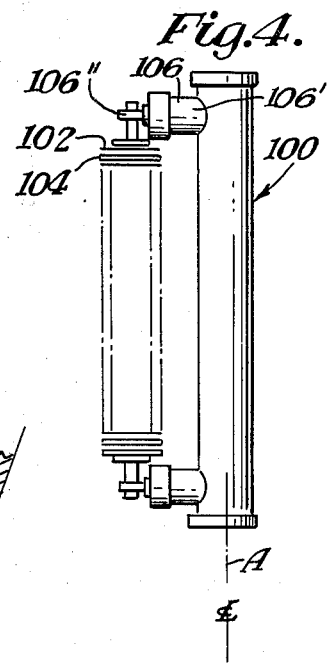
FIG. 4 is a side view of a slit-cleaning system.

Referring now to FIGS. 4, 5, 7, and 9 showing various embodiments of the slit-cleaning system, the slit-cleaning system 100 in FIG. 4 is utilized to clean the plurality of rows of slits in the filter element 48 from a downstream position. The slit-cleaning elements 102 and 104, etc. are connected to a slit-holding means 106. The slit-cleaning holding means 106 is rotated about the center line A. Holding means 106 is a piston 106' with reciprocating arm 106" as shown in FIG. 5. Extension 9 of arm 106" is connected to shaft 8 that holds the circular elements 102, 104, etc. between spacers 102', 104', etc. End member or cam follower 3 is fixed to shaft 8. Shaft 8 may be fixed to member 9 or may be allowed to be rotated in member 9. Shaft 8 may be positively rotated rather than frictionally driven as shown.

In use, the sequence of operation of the slit-cleaning system set forth hereinabove is illustrated in FIG. 8. Column X shows debris moving from an upstream position toward the filter element 48. Column Y shows debris 108 in slots such as entrances 74, 76, etc. with the slit-cleaning system members such as 102 and 104, etc. moving toward a cleaning position. Column Z illustrates the slit cleaning elements 102 and 104, etc. after they are moved into and through the slit opening or entrances 74 and 76. The distal ends of the slit-cleaning elements shown by numerals 110 and 112 have forced the debris 108 out from the slit openings to an upstream position toward the fluid inlet. The debris and trash is moved away from the upstream surface of the filter element by scraper means such as shown in FIG. 7 by numerals 113 and 116.

Figure 9:
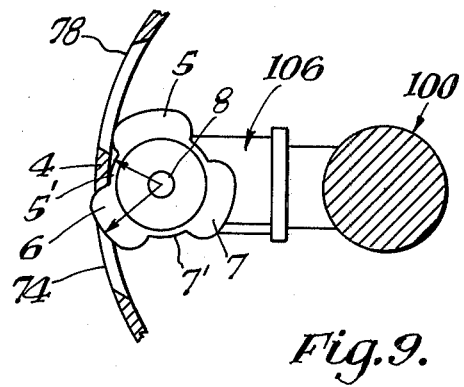
FIG. 9 is an illustration of another embodiment of the slit-cleaning system showing a toothed slit-cleaning element.

The circular elements 102 and 104 with ends 110 and 112 move from row opening to row opening through slots 90 and 92 as shown in FIG. 3. When no intermediate slots appear as illustrated in FIG. 6, the slit-cleaning elements may be shaped as shown in FIG. 9 showing lobes 5, 6 and 7. The spaces 5', 6', and 7' bridge the member 4 positioned between the rows.

Referring now to FIG. 7, the filtering system 120 includes a slit type filter element 121 and scraper units 113, 114, 115 and 116. The filter element 121 that may be made of a stainless steel plate which is slit to provide a plurality of rows of slits as shown in FIG. 2. Each row includes a plurality of slits. Slits are illustrated by arrows 122 in FIG. 7.

The scrapers 114 and 115 are rotated on shaft 100' with slit-cleaning elements 102' and 134 as shown in FIG. 7. Each scraper 114 and 115 is placed between the array of slit-cleaning element 102' and 134. The two arrays of slit-cleaning discs 1002 and 134 and scrapers 114 and 115 are supported on a single driven axle or shaft 100'. At the top and bottom of the array of slit-cleaning discs 102' and 134, the supporting shaft 8' and 142 is supported by movable rod means such as shown in FIG. 5 that allow the shafts 8' and 142 to move radially. This movement is necessary when the circumference of the discs move from row to row. The shafts 8' and 142 will also move if foreign material is placed between the slit-cleaning discs and the filtering element.

The scraper discs may be made of thin stainless steel material and may be formed in the shape of flat discs. The thickness of scraper discs are slightly thinner than that of the mesh M of the slit as shown in FIG. 3. The pitch between slit-cleaning discs is the same as pitch $P_1$ between the adjacent slits, so that the slit-cleaning discs will move into and through the slit without fail. This movement will rid the filter element openings or debris shown in FIG. 8.

Figure 10:
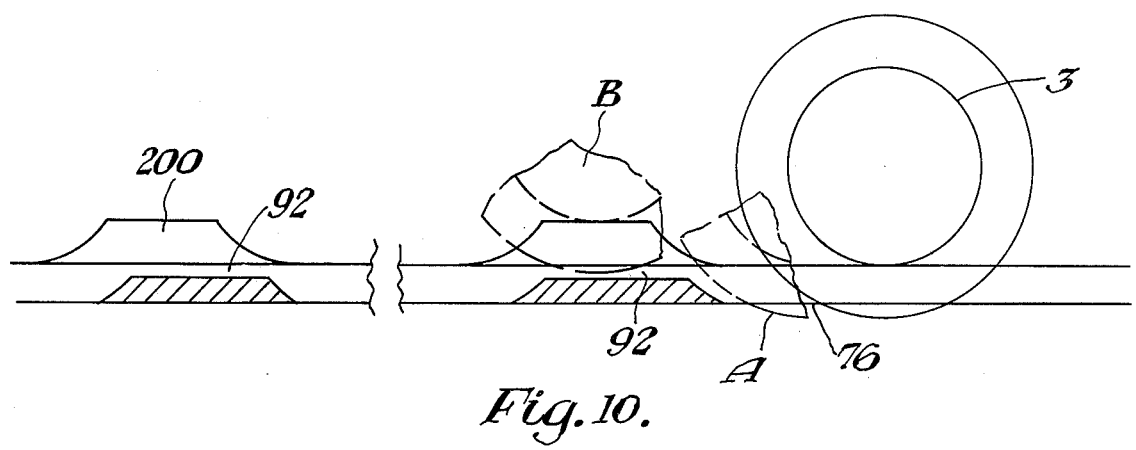
FIG. 10 is an illustration showing cam means on the filter element and a cam follower on the slit-cleaning system.

Referring now to FIG. 10, along at least one area of the downstream surface of this filter element is a plurality of cam surfaces 150, 150', 150'', etc. The slit-cleaning means can include a cam follower 3 to move the slit-cleaning elements in and out of the slits without allowing the edges of the elements to contact the filter element with a great force.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. In a filter cleaning system, a filter comprising:
a body of sheet material having a generally broad upstream surface and downstream surface with a plurality of individual, spaced apart, long, narrow through openings,
each said opening having an entrance on said upstream surface and an exit on said downstream surface with said exits being larger than each said entrance,
each said exit aligned with respect to said entrance,
each said opening including side walls and end walls sloping away from the opposite wall between said entrance and said exit, and
each said exit having interconnection means in said downstream surface that extend between adjacent exits, said interconnection means for guiding slit-cleaning fingers from one entrance to an adjacent entrance.

2. In a filter cleaning system, a filter as set forth in claim 1, wherein:
said body having at least one generally smooth surface for movement of a scraper.

3. In a filter cleaning system, a filter as set forth in claim 2, wherein:
said body has a generally uniform thickness, and an additional scraper for said upstream surface.

4. In a filter cleaning system, a filter as set forth in claim 2, wherein:
said walls having a smooth surface, and
said interconnection means width is at least equal to the narrow width of the entrance.

5. In a filter cleaning system, a filter as set forth in claim 4, wherein:
said end walls funnel objects into said slots.

6. In a filter assembly, comprising:
a filter for filtering foreign matter out of a fluid,
a cleaning means for cleaning foreign matter from the filter,
said filter including a body of sheet material having a generally broad upstream surface and broad downstream surface, said body having a plurality of individual spaced apart, long, narrow through openings in aligned rows and columns,
each said opening having an entrance on said upstream surface and an exit on said downstream surface with sides, each said exits being larger than each said entrance,
each said opening including side walls and end walls sloping away from the opposite wall between said entrance and said exit,
said cleaning means including a plurality of slit-cleaning elements connected to a movable element holding means for positioning each said element to move along a column of said openings in a plurality of rows and to move each element into each said entrance in said filter for removing debris deposited in said opening, and
said cleaning means connected to said filter assembly,
said filter assembly includes means for guiding said cleaning elements through said end wall from said entrance in one column to said entrance in the adjacent column.

7. In a filter assembly as set forth in claim 6, wherein:
said cleaning means connected to said filter assembly downstream of said filter,
said holding means for moving each element through said entrance to push the foreign matter in said opening upstream.

8. In a filter assembly as set forth in claim 7, wherein:
each said column opening is aligned along their longitudinal axis.

9. In a filter assembly as set forth in claim 6, wherein:
said means for guiding is an interconnecting slot.

10. In a filter assembly as set forth in claim 9, wherein:
said interconnecting slot is equal in width to said entrance.

11. In a filter assembly, comprising:
a filter for filtering foreign matter out of a fluid,
a cleaning means for cleaning foreign matter from the filter,
said filter including a body of sheet material having a generally broad upstream surface and broad downstream surface, said body having a plurality of individual spaced apart, long, narrow through openings in aligned rows and columns,
each said opening having an entrance on said upstream surface and an exit on said downstream surface with sides, each said exits being larger than each said entrance,
each said opening including side walls and end walls sloping away from the opposite wall between said entrance and said exit,
said cleaning means including a plurality of slit-cleaning elements connected to a movable element holding means for positioning each said element to move along a column of said openings in a plurality of rows and to move each element into each said entrance in said filter for removing debris deposited in said opening, and
said cleaning means connected to said filter assembly downstream of said filter,
said holding means for moving each element through said entrance to push the foreign matter in said opening upstream,
each said column opening is aligned along their longitudinal axis,
a scraper cleaning means connected to said filter assembly for cleaning the upstream surface of said filter.

12. In a filter assembly as set forth in claim 11, wherein:
said filter assembly includes means for guiding said cleaning elements through said end wall from said entrance in one column to said entrance in the adjacent column.

* * * * *